June 2, 1959  G. F. HUGHES-CALEY  2,889,158
LUGGED ENGAGEMENT TYPE COUPLING WITH
RECIPROCABLE SLEEVE LOCKING MEANS
Filed June 30, 1958  2 Sheets-Sheet 1

GEORGE F. HUGHES-CALEY
INVENTOR

BY Ralph E. Bitner
ATTORNEY

June 2, 1959  G. F. HUGHES-CALEY  2,889,158
LUGGED ENGAGEMENT TYPE COUPLING WITH
RECIPROCABLE SLEEVE LOCKING MEANS
Filed June 30, 1958  2 Sheets-Sheet 2
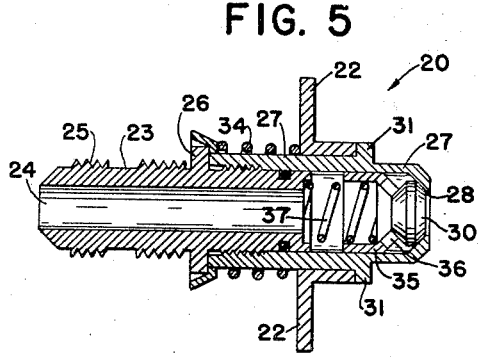
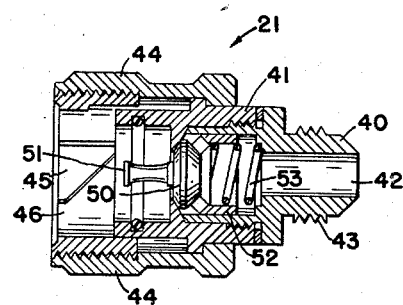
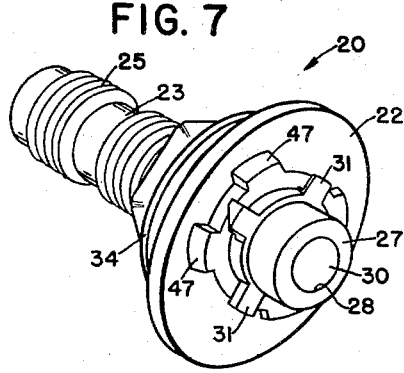
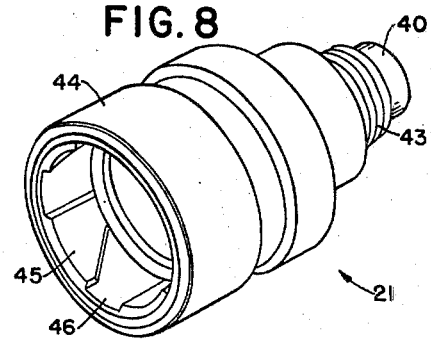
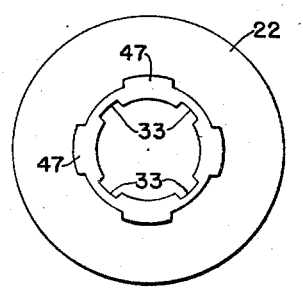
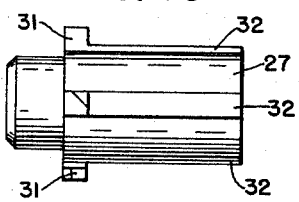
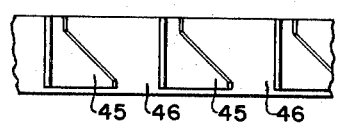
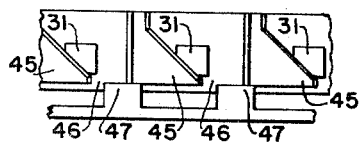
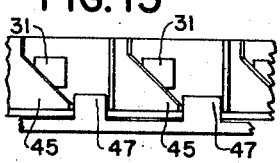
GEORGE F. HUGHES-CALEY
INVENTOR
BY Ralph W. E. Bitner
ATTORNEY United States Patent Office 2,889,158
Patented June 2, 1959

2,889,158

LUGGED ENGAGEMENT TYPE COUPLING WITH RECIPROCABLE SLEEVE LOCKING MEANS

George F. Hughes-Caley, Los Altos Hills, Calif.

Application June 30, 1958, Serial No. 745,745

1 Claim. (Cl. 285—86)

This invention relates to a mechanical coupling which may be employed for joining two pressurized tubes, electrical connectors, or mechanical power transmitting rods. The invention has particular reference to a means of locking two portions of a coupling in mechanical engagement by an arrangement which is capable of being unlocked easily and quickly by manual manipulation.

Many couplings have been designed and manufactured which are capable of being locked into place after some adjustment has been made or after a tool has been applied to the coupling to perform a locking function. The present invention provides a positive lock for a mechanical coupling which will not jar loose even under the most severe applications of mechanical vibration. Connection and disconnection may be made with one hand and, at the same time as parts of the coupling are joined, electrical connections, hydraulic coupling, pneumatic coupling, or mechanical transmission lines may be joined and held securely in operative contact until disconnection is desired. Prior art couplings have all contained some undesirable features or have failed to perform the desired results quickly and easily.

One of the objects of this invention is to provide an improved coupling which avoids one or more of the disadvantages and limitations of prior art arrangements.

Another object of the invention is to provide a coupling which can be operated with one hand and which will remain in coupled operation for any desired length of time.

Another object of the invention is to provide a mechanical coupling having a valve member in the end of each of the two coupled members wherein the valve on each member will be opened upon connection of the coupling and will be closed upon disconnection of the coupling.

Another object of the invention is to provide a mechanical coupling which must be securely locked into operative position, otherwise it will disconnect itself.

Another object of the invention is to provide resilient means in a mechanical coupling which automatically disconnects the coupling members as soon as a locking member is moved to a disconnect position.

Other important objects of the present invention will be found in its simplicity of construction, rigidity of mounting, positiveness of locking, its adaptability for various other purposes, and its especial adaptability to the aircraft industry.

The invention comprises a coupling for joining two mechanical units and includes a tubular male member on one of said units having a plurality of outwardly extending lugs. A tubular female member on the other of said units includes a plurality of inwardly extending lugs formed and spaced so as to permit passage around the lugs on the male member. Each of the male and female lugs have helical cam faces which cooperate to assist in the coupling operation. The members are adapted to be rotated while being joined and a locking member containing a plurality of lugs is then resiliently moved into the spaces between the lugs on the female member to positively lock the two members together.

One feature of the invention includes a helical cam face on each of the female lugs so that the two portions of the coupling may be brought into locking engagement by a rotary motion. Still another feature of the invention includes an outwardly extending flange for engagement with the fingers of an operator during the operation of disconnecting the coupling.

For a better understanding of the present invention, together with other and further objects thereof, reference is made to the following description taken in connection with the accompanying drawings.

Fig. 5 is a cross sectional view showing the male portion of the coupling of Fig. 2 and indicating the position of the valve poppet in the disconnected condition.

Fig. 6 is similar to Fig. 5 but showing the female portion.

Fig. 7 is an isometric view of the male portion.

Fig. 8 is an isometric view of the female portion.

Fig. 9 is a plan view of the locking member disconnected from the coupling.

Fig. 10 is a side view of the male portion which contains a poppet valve and includes the male lugs and longitudinal splines.

Fig. 11 is a development view showing the shape of the inwardly extending lugs on the female member.

Fig. 12 is a view similar to Fig. 11 but showing portions of the male lugs and portions of the locking member in a partially engaged position.

Fig. 13 is a view similar to Fig. 12 but showing the components in their locked position.

Figure 1:
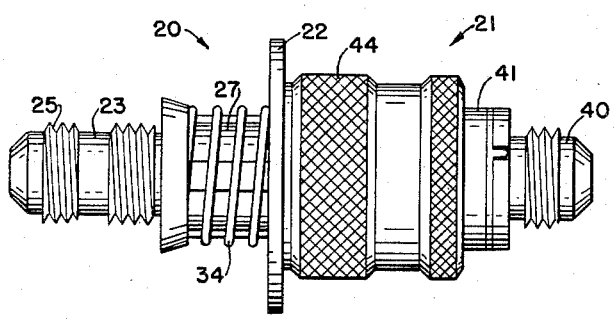
Fig. 1 is a side view of the coupling showing threaded portions at each end thereof for attaching to pipes or hose.
Figure 2:
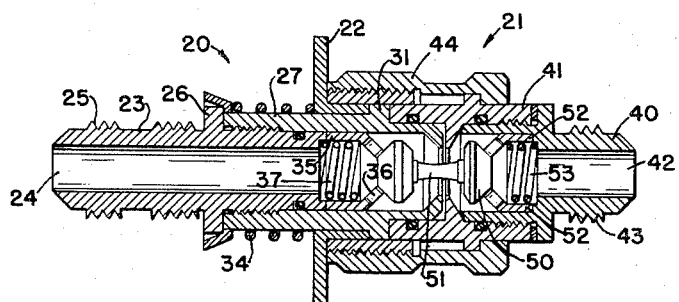
Fig. 2 is a cross sectional view of the coupling shown in Fig. 1, the section being taken along the axis of the coupling and showing the internal details of two hydraulic valves.
Figure 3:
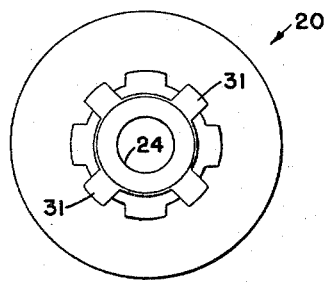
Fig. 3 is an end view of the male portion of the coupling shown in Fig. 2 when it has been disconnected from the male portion.
Figure 4:
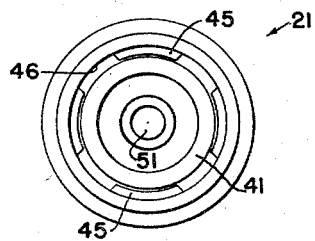
Fig. 4 is an end view of the female portion of the coupling shown in Figs. 1 and 2.

Referring now to Figs. 1 to 8, inclusive, the coupling comprises a male portion 20, a female portion 21, and a locking ring 22. The male portion includes a cylindrical block 23 having a hole 24, the end of which is formed with a thread 25 to accommodate a screw coupling which will join the block to a hose or pipe. The views shown in Figs. 2 and 5 include a flange 26 which may be employed to secure this portion of the coupling to the side of a tank or a bulkhead. Cylinder 23 is joined by a thread to a hollow cylindrical tube 27 which has an opening 28 (see Figs. 5 and 7) at its free end and includes, just inside the opening, a poppet valve plunger 30. Cylinder 27 also includes a plurality of outwardly extending lugs 31 and a plurality of splines 32 which are employed to hold the locking ring 22 from rotation on member 27.

The locking ring 22 surrounds the male member 27 and contains internal splines formed between grooves 33 (Fig. 9) which mesh with external splines 32 on the male member and provide for longitudinal movement of the ring along the male member for its entire length. A helical spring 34 resiliently forces the locking ring and the male member to the positions shown, this spring being compressed only when the coupling is being disconnected or joined.

The poppet valve plunger 30 is formed integral with a sleeve 35 which slides on the inside surface of the male member 27. Holes 36 are formed in this sleeve for the passage of fluid when the valve is open and a helical spring 37 resiliently forces the plunger into closed engagement with the inside valve surface on member 27 when the male and female members are separated.

The female member 21 includes a valve assembly similar to the valve in the male member and comprises a cylinder 40 and a hollow cylindrical portion 41 which is formed with an inside valve surface. Cylinder 40 and portion 41 are permanently joined by a screw thread means and cooperate to form the female poppet valve. Cylinder 40 is provided with an axial opening 42 for the passage of fluid and a thread 43 for attaching a conduit or flexible hose.

The female member also includes an outer shell 44 which slides on portion 41 and contains inwardly extending lugs 45. Shell 44 is usually made in two pieces, as shown, for ease in assembly. These two pieces are permanently joined and act as a single member after the assembly operation. The lugs 45 cooperate with outwardly extending lugs 31 on the male member to join the coupling. Lugs 45 are separated by recessed channels 46 to accommodate lugs 45 when entering the female shell and locking lugs 47 on the locking ring 22.

The poppet valve on the female member is similar to the poppet valve on the male member and includes a plunger 50 which makes contact with a valve surface on cylinder 41 when the valve is closed. An extended portion 51 engages the valve plunger 30 in the male member when the coupling is joined and forces both poppet valves open. Plunger 50 is formed integral with a sleeve 52 which slides on the inside surface of cylinder 40. The plunger is resiliently stressed by a spring 53 which forces the valve to its closed position, when the members are separated. It should be noted that the two valve springs 37 and 53 are resiliently urging the valves to close and this action tends to separate the two members. When the male and female members are joined the springs must be compressed and when the members are separated the springs aid to force the members apart.

The operation of the coupling is as follows: When the two members are separated, both valves are closed because springs 37 and 53 force valve plungers 30 and 50 into closed engagement with the cooperating valve seats. Considerable pressure (or vacuum) can be maintained in both pipe portions 24 and 42 in this condition. To join members 20 and 21, the female member 21 is placed over the end of the male member 20 and the female shell portion 44 is given a twisting motion. Lugs 31 on the male member will then enter the recessed portions 46 on the female member, and on further twisting, lugs 31, ride in on the cam faces of the inwardly extending lugs 45. When the members are fully joined, the lugs 47 of the locking ring enter the recessed portions 46 and the two members are locked together. Spring 34 holds the locking ring in its locked position.

Figures 11, 12, and 13, are developments of the locking lugs and are designed to illustrate the action of the locking ring lugs. Fig. 11 shows the female lugs alone before the joining operation. Fig. 12 shows the male lugs 31 partly turned into engagement with the female lugs 45 and the lugs 47 of the locking ring still out of engagement. Fig. 13 shows the locked position with the locking ring lugs in their locked position.

It will be evident from Figs. 12 and 13 that the two members must be fully locked, otherwise the two members will be separated of their own accord. If, during the locking operation, the members are left in the position as shown in Fig. 12, three springs cooperate to force the members apart. These are the two valve springs 37 and 53 and the locking spring 34. When the coupling force is withdrawn in this position lugs 31 slide off lugs 45 and the members are separated. However, if the members are fully joined as indicated in Fig. 13 they will remain in that condition until the locking ring is disengaged. It should be remembered that splines 32 and between grooves 33 retain the locking lugs 47 and the male lugs 31 in the position shown so that they cannot rotate relative to each other.

In addition to the features described above, the cam faces on lugs 45 and 31 aid in the joining operation by requiring only a twisting motion. Longitudinal pressure on joining is not necessary.

This application is a continuation-in-part of application Serial No. 484,772, filed January 28, 1955, for Quick Coupling.

While there has been described and illustrated a specific embodiment of the invention, it will be evident that various changes can be made in the coupling without changing the field of the invention which should be limited only by the scope of the appended claim.

I claim:

A mechanical coupling comprising two mechanical units to be coupled including a tubular male member on the first of said units including a plurality of longitudinal outwardly and axially extending splines, each having an outwardly extending lug formed thereon, said lugs formed with helical cam faces disposed at an angle which is greater than thirty degrees from a transverse plane normal to the coupling axis; a tubular female member rotatably supported on the second of said units including a plurality of inwardly extending lugs, each of said lugs formed with a helical cam face disposed at the same angle and adapted to engage the cam faces on the male lugs; said inwardly and outwardly extending lugs being circumferentially spaced so as to permit axial passage of the lugs when the male and female members are joined by telescoping the units; means engageable between the male and female members to limit axial movement of the female member relative to the male member and maintain the cam faces in engagement; an axially displaced and manually operated locking member on said tubular male member having inwardly extending splines complementary with said outwardly extending splines on the male member, said locking member also having outwardly and axially extending splines circumferentially aligned with said inwardly extending splines which lock between the inwardly extending lugs on the female member after the male and female members are joined and the female member is rotated; means engaging said locking member resiliently urging said locking member to make contact with the lugs on the male member; and additional resilient means mounted within the coupling acting between the male and female members to automatically axially separate the units by exerting an axial force between said male and female members during which said female member rotates on said cam faces relative to said mechanical units and male member whenever the locking member is axially displaced from its locked position.

No references cited.